Figure 1:
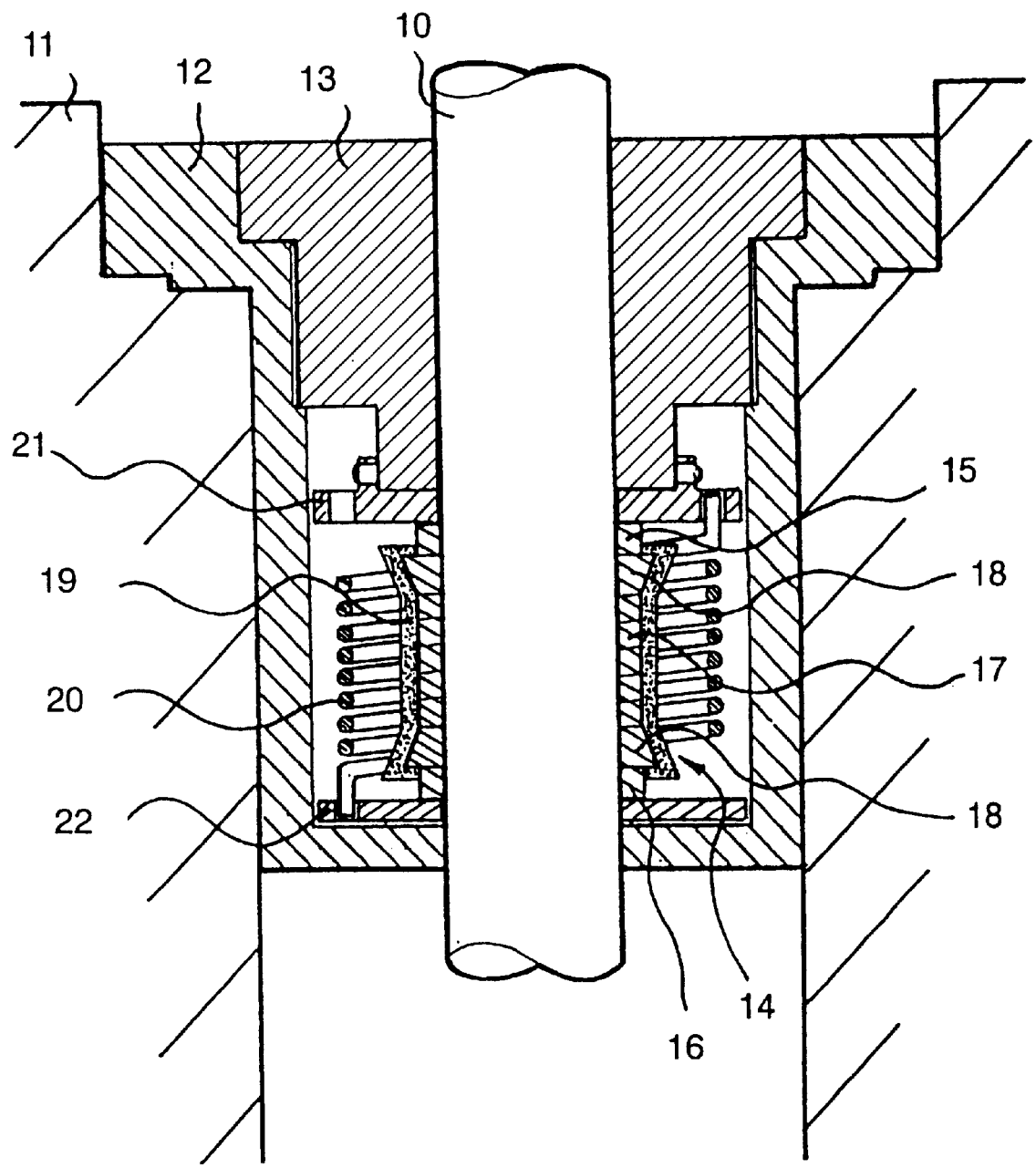

United States Patent

Nowak

[11] Patent Number: 6,098,986
[45] Date of Patent: Aug. 8, 2000

[54] SEAL

[75] Inventor: Stanley Nowak, Leeming, Australia

[73] Assignees: Aileendonan Research Pty Ltd; Gian Research Pty Ltd., both of Nedlands, Australia

[21] Appl. No.: 09/076,045

[22] Filed: May 11, 1998

[30] Foreign Application Priority Data

May 16, 1997 [AU] Australia .................................. PO6835
Dec. 19, 1997 [AU] Australia .................................. PP1057

[51] Int. Cl.$^7$ ............................... F16J 15/18; F16J 15/16
[52] U.S. Cl. ........................ 277/345; 277/510; 277/511; 277/522; 277/526
[58] Field of Search .................................. 277/510, 511, 277/520, 522, 526, 528, 578

[56] References Cited

U.S. PATENT DOCUMENTS

| | | | |
|---|---|---|---|
| 272,508 | 2/1883 | Zeppenfield | 277/578 X |
| 490,107 | 1/1893 | Ferguson | 277/520 |
| 1,019,607 | 3/1912 | Danver | 277/502 |
| 1,988,216 | 1/1935 | Ryan | 277/530 |
| 2,776,154 | 1/1957 | Leistensnider | 277/528 |
| 2,979,351 | 4/1961 | Wilkins | 277/510 |
| 3,164,388 | 1/1965 | Ellis | 277/528 |
| 3,442,518 | 5/1969 | Henshaw | 277/528 |
| 3,490,775 | 1/1970 | Henshaw | 277/528 |
| 3,628,798 | 12/1971 | Melhope . | |
| 5,152,537 | 10/1992 | Dartnall . | |
| 5,492,342 | 2/1996 | Dartnall et al. . | |

FOREIGN PATENT DOCUMENTS

| | | |
|---|---|---|
| 620585 | 8/1989 | Australia . |
| 656241 | 5/1993 | Australia . |
| 28273/92 | 1/1995 | Australia . |
| 656 241 | 1/1995 | Australia . |
| 1 147 802 | 11/1957 | France . |
| 27 22 754 | 11/1978 | Germany . |

Primary Examiner—Anthony Knight
Assistant Examiner—Enoch E Peavey
Attorney, Agent, or Firm—Ladas & Parry

[57] ABSTRACT

A seal (14) for use between a pair of substantially concentric elements (10 and 11) capable of relative movement with respect to each other, said seal comprising a sealing element (17) having a configuration of a helix wherein the opposed axial faces of the helix are of complementary configuration and are in close abutting relationship with each other, said sealing element (17) being formed of a rigid resilient wear resistant material having a low coefficient of sliding friction, said sealing element (17) being adapted to be supported from one element (11) by a support means (13) and being in close abutting relationship with the other element (10), a clamping means (19) for causing resilient compression of the seal against the other element, a resilient means (20) mounted between the axial ends of the sealing element (17) and adapted to resiliently resist relative rotation between the ends of the sealing element (17) in a direction which will cause the sealing element (17) to expand radially.

37 Claims, 2 Drawing Sheets

SEAL

THIS INVENTION relates to a seal and in particular relates to a seal which is to be used in providing sealing engagement between two members which are capable of relative movement with respect to each other.

One particular application of the invention relates to a seal which can be used to provide a seal between two elements capable of relative rotation with respect to each other while another particular application of the invention relates to a seal which can be used to provide a seal between two elements capable of relative axial movement with respect to each other such as with an axially reciprocating shaft.

The invention comprises a development of the seals which are the subject of Australian patent specifications 620585 and 656241. In some instances it has been found that seals of the form which are disclosed in those patent specifications will be caused to loosen in their sealing engagement with one of the elements. It would seem that this is as a result of some relative rotation between the ends of the helical seal which results in the seal expanding radially.

It is an object of the invention to provide a seal which will maintain its sealing engagement with the elements with which it is associated when subjected to both relative rotational and/or longitudinal movement between the elements.

Accordingly the invention resides in a seal for use between a pair of substantially concentric elements capable of relative movement with respect to each other, said seal comprising a sealing element having a configuration of a helix wherein the opposed axial faces of the helix are of complementary configuration and are in close abutting relationship with each other, said sealing element being formed of a rigid resilient wear resistant material having a low coefficient of sliding friction, said sealing element being adapted to be supported from one element by a support means and being in close abutting relationship with the other element, a clamping means for causing resilient compression of the seal against the other element, a resilient means mounted between the axial ends of the sealing element and adapted to resiliently resist relative rotation between the ends of the sealing element in a direction which will cause the sealing element to expand radially.

According to a preferred feature of the invention the resilient resistance provided by the resilient means can be varied.

According to a preferred feature of the invention the resilient means comprises a coil spring received around the sealing element and fixed at its ends to the opposite ends of the sealing element.

According to a preferred feature of the previous feature the spring is pretensioned to apply a torque which will bias the sealing element to contract radially.

According to a preferred feature of the two previous features the spring is pretensioned to apply an axially compressive force to the sealing element.

According to one embodiment, one end of the spring is fixed to the support means and the other end is fixed to the end of the sealing element remote from the support means. According to one form of the embodiment the sealing element is capable of being angularly displaced relative to the support means to vary the torsion of the spring.

Accordingly the invention also resides in a seal for use between a pair of elements which are capable of relative movement with respect to each other where one element has a substantially circular cross section, said seal comprising a first bush configured to be received in close radially abutting relationship with the one element and being associated at one end with a sealing element, said sealing element having a helical configuration where opposed axial faces of the helix are of complementary configuration and are in close abutting relationship and where the opposed axial faces of the helix and the first bush are of a complementary configuration and are in close abutting relationship, said first bush and sealing element being integral and being formed of a resilient wear resistant material having a low coefficient of sliding friction and a high modulus of rigidity said seal further comprising an elastomeric sleeve extending over the radial face of the sealing element and of an adjacent portion of the first bush which is remote from the one element, said sleeve applying a radially compressive force on the seal against the one element, the first bush being adapted to be supported from the other element, the seal further comprising a resilient means mounted between the ends of the sealing element and adapted to resiliently resist relative rotation between the ends of the sealing element in a direction which will cause the sealing element to expand radially.

According to a preferred feature of the invention the resilient resistance provided by the resilient means can be varied.

According to a preferred feature of the invention the resilient means comprise a coil spring received around the seal and fixed at its ends to the opposite ends of the sealing element.

According to a preferred feature of the previous feature the spring is pretensioned to apply a torque which will bias the sealing element to contract radially.

According to a preferred feature of two the previous features the spring is pretensioned to apply a rotational force to the sealing element.

According to one embodiment, one end of the spring is fixed to the support means and the other end is fixed to the end of the seal remote from the support means. According to one form of the embodiment the seal is capable of being angularly displaced relative to the support means to vary the tension of the spring.

According to a preferred feature of the previous preferred features a second bush is located at the opposite side of the sealing element to the first bush and is integral with the sealing element wherein the spring is fixed at its ends to the first and second bush.

According to a preferred feature of the previous preferred features the spring is pretensioned to apply a torque which will bias the sealing element to contract radially.

According to a preferred feature of the previous preferred features the spring is pretensioned to apply an axially compressive force to the sealing element.

Figure 2:
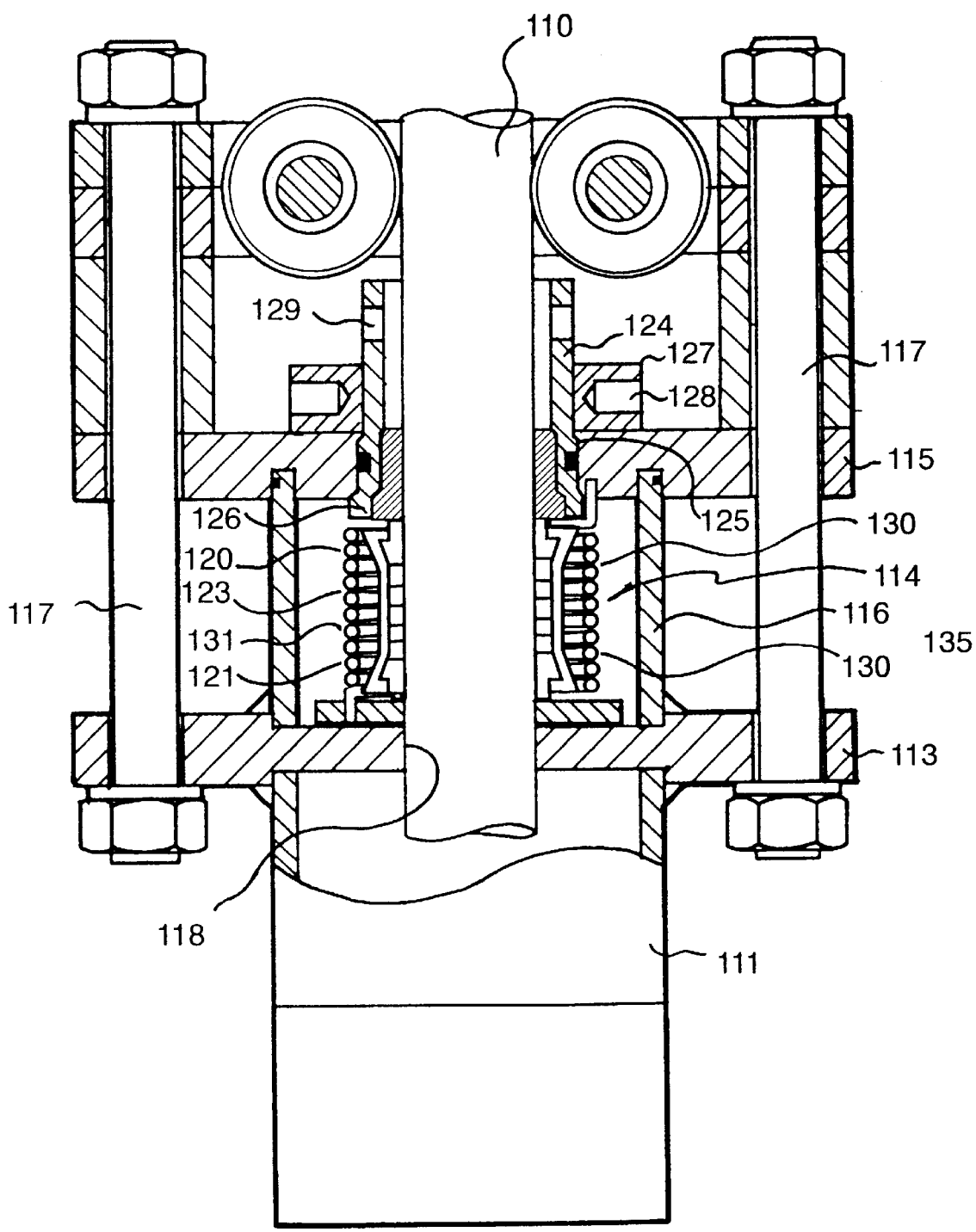

The invention will be more fully understood in the light of the following description of several specific embodiments. The description is made with reference to the accompanying drawings of which:

FIG. 1 is a schematic sectional elevation of a seal according to the first embodiment in position between a pair of elements; and FIG. 2 is a schematic sectional elevation of a seal according to the second embodiment in position between a pair of elements.

The seal according to the first embodiment, as shown at FIG. 1, is intended for use in a circumstance where it is necessary to provide a seal around a rotating and/or reciprocating shaft 10 which is supported from a housing 11 through a bearing (not shown). The seal 14 is accommodated within a protective shroud 12 which is supported from the housing 11 and has a generally cylindrical configuration. The seal 14 is adapted to be slidably received over the shaft 10 and to be supported from the housing 11 through the shroud 12.

The seal 14 comprises a pair of end bushes 15 and 16 which are axially spaced from each other by a sealing element 17 where the end bushes 15 and 16 and the sealing element 17 are formed to be integral with each other. One bush 15 is integrally formed as a part of a support body 13 which is threadably engaged with the internal bore of the shroud 12.

The sealing element 17 comprises a helix and one end of the helix is integral with one end bush 15 while the other end of the helix is integral with the other end bush 16. The other end bush is formed to be circumferentially discontinuous to be capable of some resilient radial expansion and contraction. The bushes 15 and 16 and the sealing element 17 are formed of a resilient wear resistant material which has a substantially low coefficient of sliding friction and a high modulus of rigidity. In addition the opposed axial faces of the helix and the opposed axial faces of the helix and the bushes are of a complementary configuration and are in close abutting relationship with each other.

The outer face of each bush 15 and 16 is formed with an annular ridge 18 which is formed to have a barbed configuration having a gently sloping face proximate the sealing element 17 and a sharply inclined or perpendicular face remote from the sealing element.

The seal further comprises an elastomeric sleeve 19 which is received over the exterior face of the sealing element 17 and of the bushes including the annular ridges 18 hereon. The barbed configuration of each ridge 18 serves to prevent axial movement of the sleeve over the sealing element to ensure that the sleeve 19 is retained in position over the sealing element. The dimensions of the elastomeric sleeve 19 are such that on its application over the seal a radially compressive force is applied to the bushes and the sealing element. In addition during application of the sleeve 19 over the sealing element it is able to be stretched axially between the ridges 18 provided on opposed seals to provide for some axial compression of the sealing element 17. As a result the sleeve 19 serves to apply an axial force between the bushes and the sealing element such that the opposed axial faces of the sealing element and bushes and of each turn of the helix of the sealing element are held in close abutting relationship and because of their complementary configuration a sealing relationship is formed between them. In addition the radial compression which is applied to the sealing element 17 by the sleeve 19 and the resilient nature of the helix of the sealing element serves to enable that the sealing element to be clampingly received over the shaft 10 and further serves to enhance its sealing engagement with the shaft. Furthermore the capacity of the other bush 16 to radially expand or contract serves to ensure the application of a clamping force by the bush to maintain it in close abutting sealing relationship with the shaft. Furthermore if during use a fluid pressure is generated in the space between the exterior of the seal and the second element 11 the influence of such fluid pressure on the sleeve 19 serves to increase the sealing engagement between the sealing element and the shaft to enhance the sealing function.

The seal of the first embodiment further comprises a resilient means which applies a biasing torque to the sealing element which biases the sealing element to contract radially. The resilient means comprises a coil spring 20 mounted between a pair of annular supports 21 and 22 provided at each end of the seal. One annular support 21 is mounted around the one bush 15 and is fixed to the axial face of the support body 13 while the other annular support 22 is fixed to the outer axial face of the other bush 16. The coil spring is fixed at its ends to the respective annular support such that it encompasses the elastomeric sleeve 19. In locating the spring in position it is rotationally pretensioned to apply a torque to the sealing element whereby with relative rotation of the helix along its length as result of such torque the sealing element will be caused to radially contract.

The effect of the resilient means on the sealing element results in a resilient resistance of the seal to loosen from its sealing engagement on the shaft when subjected to a load and with relative movement of the shaft with respect to the seal.

The first embodiment described above can be used with a shaft which is capable of rotation and/or reciprocation with respect to a support housing.

The seal according to the second embodiment, as shown at FIG. 2, is intended for use in a circumstance where it is necessary to provide a seal for a stuffing box which is provided to support a reciprocating shaft 110 from one end of a tubular casing 111. The seal 114 is adapted to be slidably received over the shaft 110 and to be supported from the casing 111 between an end plate 113 fixed to the end of the casing 111 and an outer plate 115 supported in spaced relation from the end plate by a tubular spacer 1 16. The outer plate 115 and the end plate 113 are in clamping engagement with the spacer 116 and are held in such engagement by a set of clamping bolts 117 which extend between the end plate 113 and the outer plate 115. The end plate 113 is formed with an opening 118 which is received over the shaft 110 in a non-contact relationship.

The seal 114 comprises a pair of end bushes 120 and 121 which are axially spaced from each other by a sealing element 123. The sealing element 123 comprises a helix and one end of the helix is integral with one end bush 120 while the other end of the helix is integral with the other end bush 121. The bushes 120 and 121 and the sealing element 123 are formed of a resilient wear resistant material which has a substantially low coefficient of sliding friction and a high modulus of rigidity. In addition the opposed axial faces of the helix and the bushes are of a complementary configuration and are in close abutting relationship with each other.

One bush 120 is threadably received within the internal bore of a support ring 124 which is rotatably and sealingly supported in a second opening 125 formed in the outer plate 115. The one end of the support ring 124 which is located innermost is formed with a flange 126 which is adapted to engage with the inner face of the outer plate 115. The support ring 124 is associated with a locking nut 127 which is threadably received around the support ring 124 and which is located adjacent the outer face of the outer plate 115 in order that a clamping force can be applied on the outer plate 115 between the flange 126 and the locking nut 127 to retain the support ring in position on the outer plate 115. The locking nut 127 is provided with a number of angularly spaced radial recesses 128 on its outer face which enable rods or a like tool or tools to be inserted into them to cause manipulation of the locking nut to cause it to rotate on the support ring 124. In addition the outer end of the support ring 124 is provided with a set of holes 129 to enable rods or a like tool or tools to be located in the support ring to resist rotation of the support ring 124 on rotation of the locking nut 127 and on the locking nut 127 being loosened.

The support ring 124 is provided with a suitable O-ring seal which is intended to sealingly engage with the opening 125 in the outer plate 115.

The outer radial face of each bush 120 and 121 is formed with an annular ridge 130 which is formed to have a barbed configuration having a gently sloping face proximate the sealing element 123 and a sharply inclined or perpendicular face remote from the sealing element 123.

The seal further comprises an elastomeric sleeve 131 which is received over the exterior face of the sealing element 123 and of the bushes including the annular ribs 130 thereon. The barbed configuration of the ribs 130 on the sealing element 123 serves to ensure that the sleeve 131 is retained in position over the sealing element 123. The dimensions of the elastomeric sleeve 131 are such that on its application over the seal a radially compressive force is applied on the sealing element 123. In addition during application of the sleeve 131 over the sealing element 123 it is able to be stretched axially between the ribs 130 provided on the opposed bushes 120 and 121 to provide for some axial compression of the sealing element 123. As a result the sleeve 131 serves to apply an axial force between the bushes 120 and 121 and the sealing element 123 such that the opposed axial faces of the sealing element and bushes and of each turn of the helix of the sealing element are held in close abutting relationship and because of their complementary configuration a sealing relationship is formed between them. In addition to the radial compression which is applied to the sealing element 123 by the sleeve 131, the sealing element is resiliently expanded radially on it's application over the shaft 110 and as a result of the resilient nature of the helix of the sealing element 123 it serves to which serves to further enhance the sealing engagement of the sealing element 123 with the shaft 110.

During use, fluid pressure is generated in the space between the exterior of the sleeve 131 and the casing 111 and the influence of such fluid pressure on the sleeve 131 serves to increase the clamping engagement of the sealing element 123 into closer abutting relationship with the shaft and enhance the sealing function.

The seal of the second embodiment further comprises a resilient means which applies a biasing torque to the sealing element which biases the helix of the sealing element to contract axially. The resilient means comprises a coil spring 135 mounted between a the outer plate 115 and an annular plate 136 which is fixed to the outer axial face of the other bush 121. The coil spring is fixed at its ends to the outer plate 115 and the annular plate 136 such that it encompasses the elastomeric sleeve 131. In locating the spring in position it is rotationally pretensioned to apply a torque to the sealing element whereby with relative rotation of the ends of the helix as result of such torque the sealing element will be caused to axially contract. The biasing torque which is applied by the coil spring 135 can be adjusted. This is effected by loosening the locking nut 127 while restraining the support ring 124 from rotating. Once the locking nut 127 is loosened the support ring can be turned in the appropriate direction relative to the outer plate 115 . As a result the seal 1 14 is also caused to rotate relative to the outer plate 115 which serves to either increase or decrease the tension of the spring 135. Once the desired tension has been applied the locking nut 127 is tightened.

The effect of the resilient means on the sealing element results in a resilient resistance of the seal to loosen from its sealing engagement around the shaft when subjected to a load and with relative movement of the shaft with respect to the seal.

If desired the second embodiment described above can be used with a shaft which is capable of rotation and reciprocation with respect to a support housing or which is capable of rotation only with respect to a support housing.

It should be appreciated that the scope of the present invention need not be limited to the particular scope of the embodiments described above. In particular the invention need not be limited to the application described in relation to the embodiments and is applicable to a circumstance where the reciprocating and/or rotating element is outermost.

Throughout this specification, unless the context requires otherwise, the word "comprise", or variations such as "comprises" or "comprising", will be understood to imply the inclusion of a stated integer or group of integers but not the exclusion of any other integer or group of integers.

What is claimed is:

1. A seal for use between a pair of substantially concentric elements capable of relative movement with respect to each other, said seal comprising a sealing element having a configuration of a helix, wherein the opposed axial faces of the helix are of complementary configuration and are in close abutting relationship with each other, said sealing element being formed of a rigid resilient wear resistant material having a low coefficient of sliding friction, said sealing element being supported from one element of said concentric elements by a support member and being in close abutting relationship with the other element of said concentric elements, a clamping member for causing resilient compression of the seal against the other element, a resilient member mounted between the ends of the sealing element and tensioned to resiliently resist relative rotation between the ends of the sealing element in a direction which will cause the sealing element to expand radially.

2. A seal as claimed at claim 1 wherein the resilient resistance provided by the resilient member can be varied.

3. A seal as claimed at claim 1 wherein said resilient member comprises a coil spring received around the seal and fixed at its ends to the opposite ends of the sealing element.

4. A seal as claimed at claim 3 wherein the resilient resistance provided by the resilient member can be varied.

5. A seal as claimed at claim 4 wherein, one end of the spring is fixed to the support member and the other end is fixed to the end of the sealing element remote from the support member.

6. A seal as claimed at claim 5 wherein the sealing element is capable of being angularly displaced relative to the support member to vary the torsion of the spring.

7. A seal as claimed at claim 6 wherein the spring is pretensioned to apply a torque which will bias the sealing element to contract radially.

8. A seal as claimed at claim 6 wherein the spring is pretensioned to apply an axially compressive force to the sealing element.

9. A seal as claimed at claim 5 wherein the spring is pretensioned to apply a torque which will bias the sealing element to contract radially.

10. A seal as claimed at claim 4 wherein the spring is pretensioned to apply a torque which will bias the sealing element to contract radially.

11. A seal as claimed at claim 4 wherein the spring is pretensioned to apply an axially compressive force to the sealing element.

12. A seal as claimed at claim 3 wherein, one end of the spring is fixed to the support member and the other end is fixed to the end of the sealing element remote from the support member.

13. A seal as claimed at claim 12 wherein the spring is pretensioned to apply a torque which will bias the sealing element to contract radially.

14. A seal as claimed at claim 3 wherein the spring is pretensioned to apply a torque which will bias the sealing element to contract radially.

15. A seal as claimed at claim 14 wherein the spring is pretensioned to apply an axially compressive force to the sealing element.

16. A seal as claimed at claim 3 wherein the spring is pretensioned to apply an axially compressive force to the sealing element.

17. A seal for use between a first element and a second element which are capable of relative movement with respect to each other where said first element has a substantially circular cross section, said seal comprising a first bush configured to be received in close radially abutting relationship with said first element and being associated at one end with a sealing element, said sealing element having a helical configuration where opposed axial faces of the helix are of complementary configuration and are in close abutting relationship, said first bush and said sealing element being integral and being formed of a resilient wear resistant material having a low coefficient of sliding friction and a high modulus of rigidity, said seal further comprising an elastomeric sleeve extending over the radial face of the sealing element and of an adjacent portion of the first bush, said portion being remote from said first element, said sleeve applying a radially compressive force to the seal in the direction of said first element, the first bush being supported from said second element, the seal further comprising a resilient member mounted between the ends of the sealing element and tensioned to resiliently resist relative rotation between the ends of the sealing element in a direction which will cause the sealing element to expand radially.

18. A seal as claimed at claim 17 wherein the resilient resistance provided by the resilient member can be varied.

19. A seal as claimed at claim 17 wherein said resilient member comprises a coil spring received around the seal and fixed at its ends to the opposite ends of the sealing element.

20. A seal as claimed at claim 19 wherein the resilient resistance provided by the resilient member can be varied.

21. A seal as claimed at claim 20 wherein, one end of the spring is fixed to the support member and the other end is fixed to the end of the sealing element remote from the support member.

22. A seal as claimed at claim 21 wherein the sealing element is capable of being angularly displaced relative to the support member to vary the torsion of the spring.

23. A seal as claimed at claim 22 wherein the spring is pretensioned to apply a torque which will bias the sealing element to contract radially.

24. A seal as claimed at claim 22 wherein the spring is pretensioned to apply an axially compressive force to the sealing element.

25. A seal as claimed at claim 22 wherein a second bush is located at the opposite side of the sealing element to the first bush and is integral with the sealing element wherein the spring is fixed at its ends to the first and second bush.

26. A seal as claimed at claim 21 wherein the spring is pretensioned to apply a torque which will bias the sealing element to contract radially.

27. A seal as claimed at claim 20 wherein the spring is pretensioned to apply a torque which will bias the sealing element to contract radially.

28. A seal as claimed at claim 20 wherein the spring is pretensioned to apply an axially compressive force to the sealing element.

29. A seal as claimed at claim 20 wherein a second bush is located at the opposite side of the sealing element to the first bush and is integral with the sealing element wherein the spring is fixed at its ends to the first and second bush.

30. A seal as claimed at claim 19 wherein, one end of the spring is fixed to the support member and the other end is fixed to the end of the sealing element remote from the support member.

31. A seal as claimed at claim 30 wherein the spring is pretensioned to apply a torque which will bias the sealing element to contract radially.

32. A seal as claimed at claim 19 wherein the spring is pretensioned to apply a torque which will bias the sealing element to contract radially.

33. A seal as claimed at claim 32 wherein the spring is pretensioned to apply an axially compressive force to the sealing element.

34. A seal as claimed at claim 32 wherein a second bush is located at the opposite side of the sealing element to the first bush and is integral with the sealing element wherein the spring is fixed at its ends to the first and second bush.

35. A seal as claimed at claim 19 wherein the spring is pretensioned to apply an axially compressive force to the sealing element.

36. A seal as claimed at claim 35 wherein a second bush is located at the opposite side of the sealing element to the first bush and is integral with the sealing element wherein the spring is fixed at its ends to the first and second bush.

37. A seal as claimed at claim 19 wherein a second bush is located at the opposite side of the sealing element to the first bush and is integral with the sealing element wherein the spring is fixed at its ends to the first and second bush.

* * * * *